(12) United States Patent
Lian et al.

(10) Patent No.: US 10,760,662 B2
(45) Date of Patent: Sep. 1, 2020

(54) POWER-DRIVEN SYSTEM AND VEHICLE HAVING THE SAME

(71) Applicant: BYD COMPANY LIMITED, Shenzhen, Guangdong (CN)

(72) Inventors: Yubo Lian, Shenzhen (CN); Heping Ling, Shenzhen (CN); Zhen Zhai, Shenzhen (CN); Feng Zheng, Shenzhen (CN); Youbin Xu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 152 days.

(21) Appl. No.: 15/928,904

(22) Filed: Mar. 22, 2018

(65) Prior Publication Data

US 2018/0209526 A1 Jul. 26, 2018

Related U.S. Application Data

(63) Continuation of application No. PCT/CN2016/097697, filed on Aug. 31, 2016.

(30) Foreign Application Priority Data

Sep. 25, 2015 (CN) .......................... 2015 1 0621623

(51) Int. Cl.
*B60K 6/365* (2007.10)
*F16H 48/10* (2012.01)
(Continued)

(52) U.S. Cl.
CPC ................ *F16H 48/11* (2013.01); *B60K 1/02* (2013.01); *B60K 6/365* (2013.01); *B60K 6/48* (2013.01);
(Continued)

(58) Field of Classification Search
CPC ............... B60K 6/365; F16H 2048/104; F16H 2048/108; F16H 48/11
See application file for complete search history.

(56) References Cited

U.S. PATENT DOCUMENTS

| 5,492,510 A | 2/1996 | Bowerman |
| 7,520,354 B2 * | 4/2009 | Morrow ................. B60K 6/365 180/65.31 |

(Continued)

FOREIGN PATENT DOCUMENTS

| CN | 201068969 | 6/2008 |
| CN | 103671810 | 3/2014 |

(Continued)

OTHER PUBLICATIONS

International Search Report and Written Opinion for Application No. PCT/CN2016/097697, dated Nov. 25, 2016, 9 pages.

*Primary Examiner* — Tisha D Lewis

(57) ABSTRACT

A power-driven system includes: a differential; a power output shaft configured to link to a power input end of the differential; multiple input shafts; and a first motor generator. The differential includes a first planet carrier, a second planet carrier, a first planet gear, a second planet gear, a first ring gear, and a second ring gear. The first planet gear and the second planet gear are respectively disposed on the first planet carrier and the second planet carrier and respectively meshed with the first ring gear and the second ring gear. One input shaft of the multiple input shafts is configured to selectively link to the power output shaft, and another input shaft of the multiple input shafts is configured to link to the power output shaft. The first motor generator is configured to link to the one input shaft of the multiple input shafts.

18 Claims, 12 Drawing Sheets

(51) Int. Cl.
*F16H 48/11* (2012.01)
*F16H 48/06* (2006.01)
*B60K 1/02* (2006.01)
*B60K 6/48* (2007.10)
*B60K 6/52* (2007.10)
*B60K 17/354* (2006.01)
*F16H 37/08* (2006.01)
*F16H 3/00* (2006.01)

(52) U.S. Cl.
CPC .............. *B60K 6/52* (2013.01); *B60K 17/354* (2013.01); *F16H 37/0806* (2013.01); *F16H 48/06* (2013.01); *B60Y 2200/92* (2013.01); *F16H 3/006* (2013.01); *F16H 2048/104* (2013.01); *F16H 2200/0034* (2013.01); *F16H 2200/0039* (2013.01); *Y10S 903/91* (2013.01)

(56) References Cited

U.S. PATENT DOCUMENTS

| | | | | |
|---|---|---|---|---|
| 8,857,284 | B2* | 10/2014 | Kahl | F16H 3/006 74/330 |
| 9,702,449 | B2* | 7/2017 | Honda | F16H 48/06 |
| 10,100,910 | B2* | 10/2018 | Nakayama | F16H 48/10 |
| 2012/0245781 | A1* | 9/2012 | Kanamori | B60K 6/48 701/22 |
| 2014/0141922 | A1 | 5/2014 | Biermann et al. | |
| 2015/0065282 | A1* | 3/2015 | Honda | B60K 6/365 475/6 |

FOREIGN PATENT DOCUMENTS

| | | | | |
|---|---|---|---|---|
| CN | 104040222 | | 9/2014 | |
| CN | 104842768 | | 8/2015 | |
| GB | 471325 | A * | 9/1937 | ............ F16H 48/08 |

\* cited by examiner

POWER-DRIVEN SYSTEM AND VEHICLE HAVING THE SAME

CROSS-REFERENCE TO RELATED APPLICATIONS

This application is a continuation application of International Application No. PCT/CN2016/097697, filed on Aug. 31, 2016, which is based on and claims priority to and benefits of Chinese Patent Application No. 201510621623.5, filed with the State Intellectual Property Office (SIPO) of P. R. China on Sep. 25, 2015. The entire contents of the above-identified applications are incorporated herein by reference.

FIELD

The present disclosure relates to a power-driven system and a vehicle having the same.

BACKGROUND

In a differential technology known by the inventor, a differential includes a driven gear (a main reducer driven gear) of a main reducer, a planet gear, a central gear, and the like. The planet gear is mounted on a subplate of the driven gear with a square shaft and a shaft sleeve, and meshes with the central gear, to implement rotation and movement functions with a revolute pair and a planar prismatic pair. The central gear is connected to left and right axle shafts with an angular locating pin and a cylindrical pair or a spline, to output torque. In this differential, left and right housings, a planet gear shaft, and the like of an original differential are cancelled, and instead, the planet gear is directly mounted on the subplate of the driven gear of the main reducer with the square shaft and the shaft sleeve, thereby effectively reducing a quantity of parts of the differential, simplifying a structure, and reducing weight.

However, in this differential, a symmetric bevel gear is used to implement an inter-wheel differential. This is partial innovation for a conventional symmetric bevel gear differential, but cannot really resolve the following defects of the differential: an axial size is excessively large, masses of the housings and the bevel gear are large, and the reliability is poor.

SUMMARY

The present disclosure is to resolve one of the foregoing technical problems in the existing technology at least to some extent.

In view of this, the present disclosure provides a power-driven system. In a differential of the power-driven system, an epicyclic differential principle is used to implement a differential function, so that a structure is compact and simple.

The present disclosure further provides a vehicle having the power-driven system.

The power-driven system in an embodiment of the present disclosure includes a differential, where the differential includes a first planet carrier, a first planet gear, and a first ring gear, the first planet gear being disposed on the first planet carrier, and the first planet gear meshing with the first ring gear; and a second planet carrier, a second planet gear, and a second ring gear, the second planet gear being disposed on the second planet carrier, the second planet gear meshing with the second ring gear, and the second planet gear further meshing with the first planet gear, where the first ring gear and the second ring gear form two power output ends of the differential, and the first planet carrier and the second planet carrier form a power input end of the differential; a power output shaft, where the power output shaft is configured to be linked to the power input end of the differential; multiple input shafts, where one input shaft in the multiple input shafts is configured to be selectively linked to the power output shaft, and the other input shaft in the multiple input shafts is configured to be linked to the power output shaft; and a first motor generator, where the first motor generator is configured to be linked to the one input shaft in the multiple input shafts.

In the differential of the power-driven system in this embodiment of the present disclosure, the epicyclic differential principle is used to implement the differential function, so that the structure is compact and simple.

In addition, the power-driven system in this embodiment of the present disclosure may further have the following additional technical features:

In some embodiments of the present disclosure, the power output shaft, the first planet carrier, and the second planet carrier are coaxially fixed.

In some embodiments of the present disclosure, the power-driven system further includes a first output part and a second output part, where the first output part is linked to the first ring gear, and the second output part is linked to the second ring gear.

In some embodiments of the present disclosure, the first output part is a left axle shaft gear, and the second output shaft is a right axle shaft gear; and first outer teeth are disposed on the first ring gear, second outer teeth are disposed on the second ring gear, the first outer teeth mesh with the left axle shaft gear, and the second outer teeth mesh with the right axle shaft gear.

In some embodiments of the present disclosure, the power-driven system further includes an engine, where the engine is configured to selectively connect to at least one of the multiple input shafts.

In some embodiments of the present disclosure, a free driven gear is freely sleeved on the power output shaft, the free driven gear is linked to the one input shaft in the multiple input shafts, and the power-driven system further includes a synchronizer, where the synchronizer is configured to synchronize the power output shaft and the free driven gear.

In some embodiments of the present disclosure, the synchronizer is disposed on the power output shaft and is used to connect to the free driven gear.

In some embodiments of the present disclosure, a fixed driven gear is fixedly disposed on the power output shaft, and the fixed driven gear is linked to the other input shaft in the multiple input shafts.

In some embodiments of the present disclosure, a free driven gear is freely sleeved on and a fixed driven gear is fixedly disposed on the power output shaft; the power-driven system further includes a synchronizer, where the synchronizer is configured to synchronize the power output shaft and the free driven gear; and a fixed driving gear is fixedly disposed one each input shaft, and the free driven gear and the fixed driven gear respectively mesh with corresponding fixed driving gears.

In some embodiments of the present disclosure, the multiple input shafts include a first input shaft and a second input shaft, where the second input shaft is sleeved on the first input shaft; and the fixed driving gears include a first fixed driving gear fixed on the first input shaft and a second fixed driving gear fixed on the second input shaft.

In some embodiments of the present disclosure, the first input shaft is the one input shaft in the multiple input shafts, and the first motor generator is linked to the first fixed driving gear with a gear structure; or the second input shaft is the one input shaft in the multiple input shafts, and the first motor generator is linked to the second fixed driving gear with a gear structure.

In some embodiments of the present disclosure, the power-driven system further includes an engine; and a double clutch, where the double clutch includes a first connection part, a second connection part, and a third connection part, the third connection part being configured to selectively connect to at least one of the first connection part and the second connection part, the engine being connected to the third connection part, the first input shaft being connected to the first connection part, and the second input shaft being connected to the second connection part.

In some embodiments of the present disclosure, the first planet gear and the second planet gear partially overlap in an axial direction.

In some embodiments of the present disclosure, the first planet gear includes a first tooth part and a second tooth part, the second planet gear includes a third tooth part and a fourth tooth part, the first tooth part meshes with the first ring gear, the second tooth part and the third tooth part overlap in the axial direction and mesh with each other, and the fourth tooth part meshes with the second ring gear.

In some embodiments of the present disclosure, both the first planet gear and the second planet gear are cylindrical gears.

In some embodiments of the present disclosure, each of the first ring gear and the second ring gear includes a main plate part and a annular side wall part disposed on an outer periphery of the main plate part, where multiple teeth are disposed on an inner periphery of the annular side wall part, a cavity is limited between the main plate part and the annular side wall part, a cavity of the first ring gear and a cavity of the second ring gear face towards each other to form mounting space, and the first planet carrier, the first planet gear, the second planet carrier, and the second planet gear are accommodated inside the mounting space.

In some embodiments of the present disclosure, a clearance is disposed between the first ring gear and the second ring gear in an axial direction.

In some embodiments of the present disclosure, a first planet gear shaft is disposed for each first planet gear, two ends of the first planet gear shaft are respectively connected to the first planet carrier and the second planet carrier, a second planet gear shaft is disposed for each second planet gear, and two ends of the second planet gear shaft are respectively connected to the first planet carrier and the second planet carrier.

In some embodiments of the present disclosure, a revolution axis of the first planet gear overlaps a revolution axis of the second planet gear, and a revolution radius of the first planet gear is the same as a revolution radius of the second planet gear.

In some embodiments of the present disclosure, the power-driven system further includes: a first output part and a second output part, where the first output part is linked to the first ring gear, and the second output part is linked to the second ring gear; and a second motor generator and a third motor generator, where the second motor generator is linked to the first output part, and the third motor generator is linked to the second output part.

In some embodiments of the present disclosure, a transmission includes a first input shaft, a second input shaft, and a third input shaft, where the third input shaft is sleeved on the second input shaft, the second input shaft is sleeved on the first input shaft, and the engine is connected to the first input shaft, the second input shaft, and the third input shaft with a triple clutch.

In some embodiments of the present disclosure, the first ring gear is linked to a left front wheel, and the second ring gear is linked to a right front wheel; and the power-driven system further includes a fourth motor generator and a fifth motor generator, where the fourth motor generator is linked to a left rear wheel, and the fifth motor generator is linked to a right rear wheel; and an anti-skid synchronizer, where the anti-skid synchronizer is configured to selectively synchronize the left rear wheel and the right rear wheel, so that the left rear wheel and the right rear wheel rotate synchronously.

The vehicle in an embodiment of the present disclosure includes the power-driven system in the foregoing embodiment.

BRIEF DESCRIPTION OF THE DRAWINGS

These and other aspects and advantages of embodiments of the present disclosure will become apparent and more readily appreciated from the following descriptions made with reference to the drawings.

DETAILED DESCRIPTION

Figure 1:
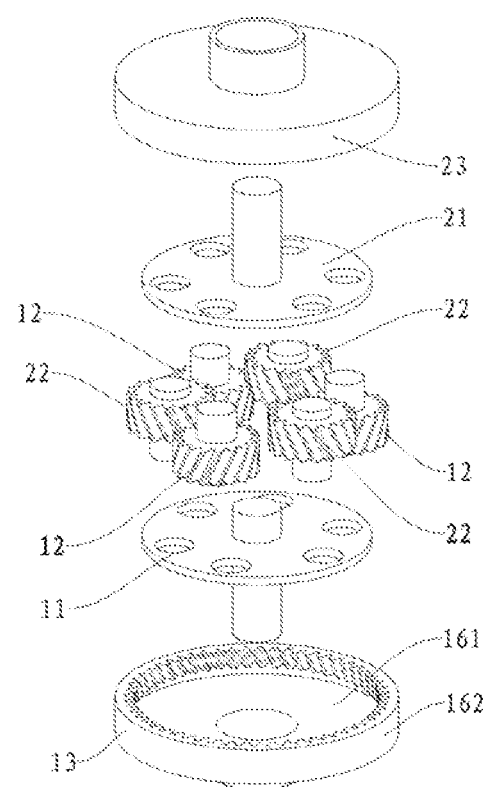
FIG. 1 is an exploded view of a differential according to an embodiment of the present disclosure.

The following describes in detail the embodiments of the present disclosure. Examples of the embodiments are shown in the accompanying drawings, and same or similar numbers represent same or similar elements or elements having same or similar functions. The embodiments described below with reference to the accompanying drawings are exemplary, and are intended to explain the present disclosure, but cannot be understood as a limitation to the present disclosure.

In the description of the present disclosure, it should be understood that directions or location relationships indicated by terms "center", "longitudinal", "landscape", "length", "width", "thickness", "upper", "lower", "front", "rear", "left", "right", "vertical", "horizontal", "top", "bottom", "inner", "outer", "clockwise", and "counterclockwise" are directions or location relationships shown based on the accompanying drawings, are merely used to facilitate description of the present disclosure and simplified descriptions, but are not used to indicate or imply that a device or an element must have a particular direction or must be constructed and operated in a particular direction, and therefore, cannot be understood as a limitation to the present disclosure.

In addition, terms "first" and "second" are merely used to describe the objective, but cannot be understood as indicating or implying relative importance or implying a quantity of indicated technical features. Therefore, features limited by "first" and "second" may indicate explicitly or implicitly that one or more features are included. In the description of the present disclosure, unless otherwise specified, "multiple" means at least two, for example, two or three.

In the present disclosure, unless otherwise clearly stipulated and limited, terms "mount", "connect", and "fix" should be understood in a generalized manner, for example, may be understood as fixed connection, detachable connection, or integration; or may be understood as mechanical connection, electrical connection, or mutual communication; or may be understood as direct connection, or indirect connection via a medium, or internal connection of two elements or a mutual relationship between two elements. A person of ordinary skill in the art may understand specific meanings of the terms in the present disclosure according to specific situations.

In the present disclosure, unless otherwise clearly stipulated and limited, that a first feature is "above" or "below" on a second feature may include that the first feature directly contacts the second feature, or may include that the first feature does not contact the second feature directly but contacts the second feature via another feature between them. In addition, that the first feature is "above" the second feature includes that the first feature is right above the second feature and is not right above the second feature, or merely represents that a horizontal height of the first feature is higher than the second feature. That the first feature is "below" the second feature includes that the first feature is right below the second feature and is not right below the second feature, or merely represents that a horizontal height of the first feature is lower than the second feature.

The following describes in detail a power-driven system 1000 in an embodiment of the present disclosure with reference to the accompanying drawings. The power-driven system 1000 may be applied to a vehicle.

As shown in FIG. 10 to FIG. 15, the power-driven system 1000 in some embodiments of the present disclosure mainly includes a differential 100, a transmission 104, and a first motor generator 401. The transmission 104 is connected between the differential 100 and the first motor generator 401.

The following first describes in detail a specific structure of the differential 100 according to an embodiment shown in the figure, and other constructions of the power-driven system 1000 will be described after the construction of the differential 100 is described in detail.

The following describes in detail the differential 100 in this embodiment of the present disclosure with reference to FIG. 1 to FIG. 9. The differential 100 may be applied to an inter-wheel differential scenario or an inter-shaft differential scenario. Using the inter-wheel differential as an example, the differential 100 can enable left and right driving wheels to rotate at different angular velocities when the vehicle turns a corner or travels on an uneven road, to ensure only rolling movement between the two driving wheels and the ground.

As shown in FIG. 1, the differential 100 in some embodiments of the present disclosure may include a first planet carrier 11, a first planet gear 12, a first ring gear 13, a second planet carrier 21, a second planet gear 22, and a second ring gear 23.

Figure 5:
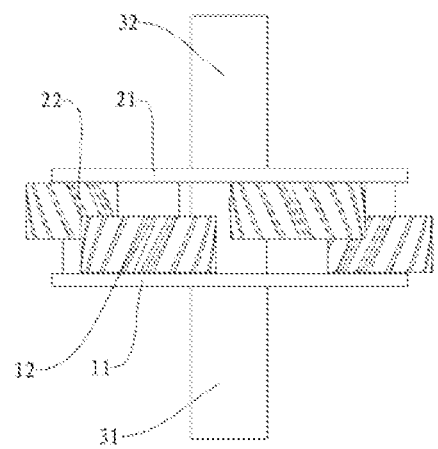
FIG. 5 is a front view of a part of the differential according to an embodiment of the present disclosure, and mainly shows a first planet carrier, a first planet gear, a second planet carrier, and a second planet gear.

With reference to embodiments of FIG. 1 and FIG. 5, the first planet carrier 11 and the second planet carrier 21 both may be constructed as round plate-shaped structures. In this way, an axial size of the differential 100 can be reduced to some extent. In some embodiments, the first planet carrier 11 and the second planet carrier 21 may be separate structures. That is, the first planet carrier 11 is separate from the second planet carrier 21. since an independent small component is easily molded, the first planet carrier 11 and the second planet carrier 21 are manufactured separately, to simplify a manufacturing process and improve the manufacturing precision.

Figure 3:
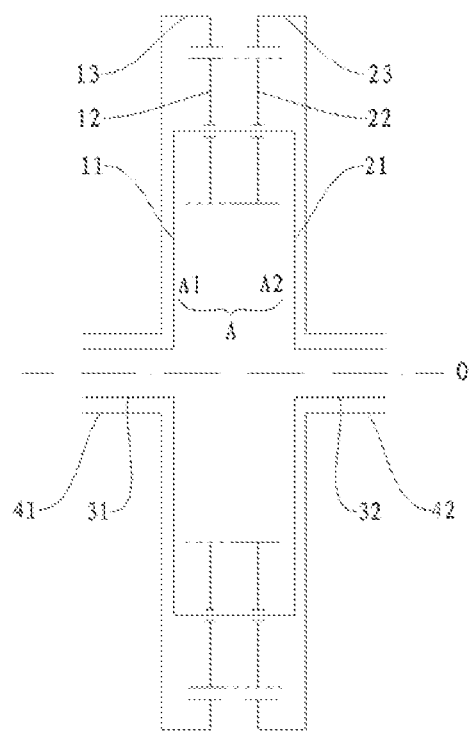
FIG. 3 is a simplified planar view of a principle of the differential according to an embodiment of the present disclosure.
Figure 6:
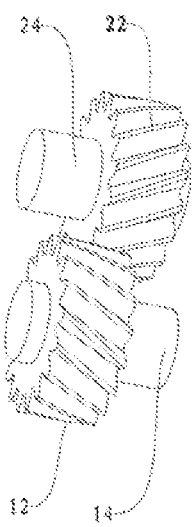
FIG. 6 is a schematic view showing meshing between a first planet gear and a second planet gear.
Figure 7:
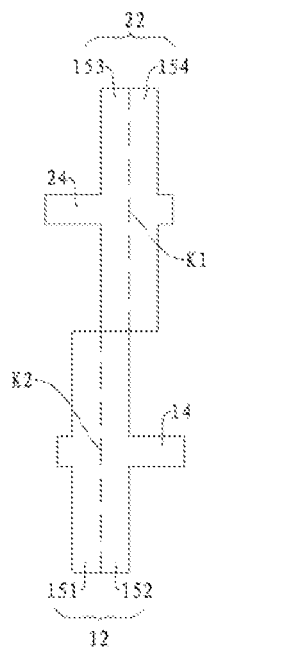
FIG. 7 is a simplified view showing meshing between a first planet gear and a second planet gear.

As shown in FIG. 1, FIG. 3, and FIG. 5, and with reference to FIG. 6 and FIG. 7, the first planet gear 12 is disposed on the first planet carrier 11. For example, one first planet gear shaft 14 is disposed for each first planet gear 12, and two ends of the first planet gear shaft 14 are respectively rotatably supported on the first planet carrier 11 and the second planet carrier 21. For example, the two ends of the first planet gear shaft 14 may be respectively rotatably supported inside corresponding shaft holes on the first planet carrier 11 and the second planet carrier 21 with bearings. In this case, the first planet gear 12 may be fixed on the corresponding first planet gear shaft 14. Certainly, the two ends of the first planet gear shaft 14 may be fixedly connected to the first planet carrier 11 and the second planet carrier 21. For example, the two ends of the first planet gear shaft 14 are respectively welded onto the corresponding shaft holes on the first planet carrier 11 and the second planet carrier 21. In this case, the first planet gear 12 is rotatably sleeved on the corresponding first planet gear shaft 14. For example, the first planet gear 12 may be rotatably sleeved on the first planet gear shaft 14 with a bearing. Therefore, the first planet carrier 11 and the second planet carrier 21 can be connected with the first planet gear shaft 14, so that the first planet carrier 11 and the second planet carrier 21 move in a same direction at a same speed (that is, the first planet carrier 11 and the second planet carrier 21 are linked). In addition, with this connection manner, the first planet carrier 11 and the second planet carrier 21 can better support/fix the first planet gear shaft 14, and a failure of the differential 100 caused by disconnection between the first planet gear shaft 14 and a single planet carrier is avoided.

As shown in FIG. 3, the first planet gear 12 meshes with the first ring gear 13, and a meshing manner may be specifically inner meshing. That is, the first planet gear 12 is located inside of the first ring gear 13 and meshes with teeth on the first ring gear 13. There may be multiple first planet gears 12, and the multiple planet gears 12 are distributed inside of the first ring gear 13 at equal angular separation in a circumferential direction. For example, there may be three first planet gears 12, and an angle between any two adjacent first planet gears 12 is 120 degrees.

Similarly, as shown in FIG. 1, FIG. 3, and FIG. 5, and with reference to FIG. 6 and FIG. 7, the second planet gear 22 is disposed on the second planet carrier 21. For example, one second planet gear shaft 24 is disposed for each second planet gear 22, and two ends of the second planet gear shaft 24 may be rotatably supported inside corresponding shaft holes of the first planet carrier 11 and the second planet carrier 21 with bearings. In this case, the second planet gear 22 may be fixed on the corresponding second planet gear shaft 24. Certainly, the two ends of the second planet gear shaft 24 may be fixedly connected to the first planet carrier 11 and the second planet carrier 21. For example, the two ends of the second planet gear shaft 24 are respectively welded onto the corresponding shaft holes on the first planet carrier 11 and the second planet carrier 21. In this case, the second planet gear 22 is rotatably sleeved on the corresponding second planet gear shaft 24. For example, the second planet gear 22 may be rotatably sleeved on the second planet gear shaft 24 with a bearing. Therefore, the first planet carrier 11 and the second planet carrier 21 can be connected with the second planet gear shaft 24, so that the first planet carrier 11 and the second planet carrier 21 move in a same direction at a same speed. In addition, with this connection manner, the first planet carrier 11 and the second planet carrier 21 can better support/fix the second planet gear shaft 24, and a failure of the differential 100 caused by disconnection between the second planet gear shaft 24 and a single planet carrier is avoided.

In addition, in some other embodiments of the present disclosure, to ensure that the first planet carrier 11 and the second planet carrier 21 can move in the same direction at the same speed, the first planet carrier 11 and the second planet carrier 21 may be directly fixedly connected with an intermediate part. That is, in the foregoing embodiment, the first planet carrier 11 and the second planet carrier 21 can move in the same direction at the same speed with the first planet gear shaft 14 and the second planet gear shaft 24, while in this embodiment, the first planet carrier 11 and the second planet carrier 21 move in the same direction at the same speed directly with the intermediate part. For example, the intermediate part can be located between the first planet carrier 11 and the second planet carrier 21 and is separately welded onto the first planet carrier 11 and the second planet carrier 21.

As shown in FIG. 3, the second planet gear 22 meshes with the second ring gear 23, and a meshing manner may be specifically inner meshing. That is, the second planet gear 22 is located at an inside of the second ring gear 23 and meshes with teeth on the second ring gear 23. There may be multiple second planet gears 22, and the multiple planet gears 22 are distributed at the inside of the second ring gear 23 at equal angular separation in a circumferential direction. For example, there may be three second planet gears 22, and an angle between any two adjacent second planet gears 22 is 120 degrees.

It should be noted that FIG. 3 is a simplified planar view of a principle of the differential 100 according to an embodiment of the present disclosure, and exemplarily shows a meshing relationship between the first planet gear 12 and the second planet gear 22, a meshing relationship between the first planet gear 12 and the first ring gear 13, and a meshing relationship between the second planet gear 22 and the second ring gear 23. As FIG. 3 is a planar view, and shows the foregoing three meshing relationships at the same time, relative location relationships between the parts are merely exemplary, and does not represent or imply actual spatial arrangement locations.

Figure 4:
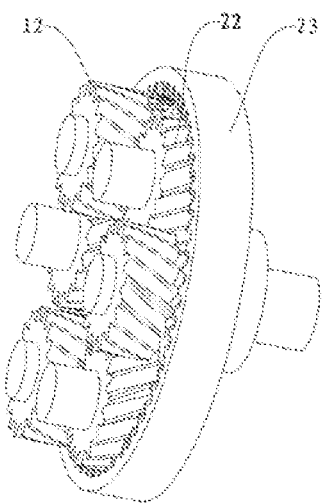
FIG. 4 is a three-dimensional view of a part of the differential according to an embodiment of the present disclosure, and does not show a first ring gear and a first planet carrier.

In an embodiment in which there are multiple first planet gears 12 and multiple second planet gears 22, the multiple first planet gears 12 and the multiple second planet gears 22 respectively mesh with each other. For example, as shown in FIG. 1 and FIG. 4, there are three first planet gears 12 and three second planet gears 22, and the first one of the first planet gears 12 may mesh with the first one of the second planet gears 22, the second one of the first planet gears 12 may mesh with the second one of the second planet gears 22, and the third one of the first planet gears 12 may mesh with the third one of the second planet gears 22. In this way, there are multiple first planet gears 12 and multiple second planet gears 22 that respectively mesh with each other, and when the differential 100 transmits power, power transmission between the multiple first planet gears 12 and the multiple second planet gears 22 that respectively mesh with each other is more stable and reliable.

In addition, in another embodiment in which there are multiple first planet gears 12 and multiple second planet gears 22, the multiple first planet gears 12 and the multiple second planet gears 22 are arranged alternately in a circumferential direction, and any adjacent first planet gear 12 and second planet gear 22 mesh with each other. That is, in this embodiment, the multiple first planet gears 12 and the multiple second planet gears 22 are arranged alternately in the circumferential direction to form an annular shape, each first planet gear 12 meshes with two second planet gears 22 adjacent to the first planet gear 12, and likewise, each second planet gear 22 meshes with two first planet gears 12 adjacent to the second planet gear 22.

With reference to the embodiment of FIG. 3, a revolution axis of the first planet gear 12 overlaps a revolution axis of the second planet gear 22, that is, the first planet gear 12 and the second planet gear 22 have a same revolution axis O, and a revolution radius (that is, a distance from a central axis of the planet gear to the revolution axis O) of the first planet gear 12 is the same as a revolution radius of the second planet gear 22.

In some embodiments, as shown in FIG. 1, FIG. 2, and FIG. 4 to FIG. 7, the first planet gear 12 meshes with the second planet gear 22. In other words, the first planet gear 12 not only meshes with the first ring gear 13, but also meshes with the second planet gear 22, and the second planet gear 22 not only meshes with the second ring gear 23, but also meshes with the first planet gear 12.

As shown in FIG. 3, the first ring gear 13 and the second ring gear 23 may form two power output ends of the differential 100, and the first planet carrier 11 and the second planet carrier 21 form a power input end of the differential 100 (for example, in this case, the first planet carrier 11 and the second planet carrier 21 may be connected rigidly). In this way, power output from an external power source may be input from the first planet carrier 11 and the second planet carrier 21, and may be respectively output from the first ring gear 13 and the second ring gear 23 after the differential 100 performs a differential function. In this case, in some embodiments, the first planet carrier 11 and the second planet carrier 21 may be connected to a power source such as an engine or a motor, and the first ring gear 13 and the second ring gear 23 may be connected to corresponding axle shafts with gear transmission structures, and the axle shafts are connected to corresponding wheels. However, this is not limited thereto.

The following briefly describes a principle of the differential 100 by using an example in which the differential 100 is applied to the inter-wheel differential scenario, the first ring gear 13 and the second ring gear 23 form the power output ends of the differential 100, and the first planet carrier 11 and the second planet carrier 21 form the power input end of the differential 100. In this case, the first ring gear 13 may be connected to a left axle shaft with outer teeth, the left axle shaft may be connected to a left wheel, the second ring gear 23 may be connected to a right axle shaft with outer teeth, the right axle shaft may be connected to a right wheel, and power output by the power source such as the engine and/or the motor may be output to the first planet carrier 11 and the second planet carrier 21 after a main reducer performs a speed reduction function. If a vehicle travels on an even road having no corner, a rotational speed of the left wheel is theoretically the same as a rotational speed of the right wheel. In this case, the differential 100 does not perform a differential function, the first planet carrier 11 and the second planet carrier 21 rotate in a same direction at a same speed, the first ring gear 13 and the second ring gear 23 rotate in a same direction at a same speed, and the first planet gear 12 and the second planet gear 22 only revolve but do not spin. If the vehicle travels on an uneven road or the vehicle goes around a corner, the rotational speed of the left wheel is theoretically different from the rotational speed of the right wheel, and a rotational speed of the first ring gear 13 is different from a rotational speed of the second ring gear 23, that is, a rotational speed difference exists. In this case, the first planet gear 12 and the second planet gear 22 revolve and spin at the same time. When the first planet gear 12 and the second planet gear 22 spin, a speed of one of the first ring gear 13 and the second ring gear 23 increases, a speed of the other one of the first ring gear 13 and the second ring gear 23 decreases, and a rotational speed difference between the ring gear whose speed increases and the ring gear whose speed decreases is the rotational speed difference between the left wheel and the right wheel, thereby implementing a differential function.

To sum up, in the differential 100 in this embodiment of the present disclosure, an epicyclic differential principle is used, so that the spatial utilization is higher in structure and connection manner, an axial size is smaller, and more advantages are brought to production and assembling. This structure not only can avoid defects of an axial size and a radial size of a bevel gear, but also can better use hollow space inside the main reducer driven gear, thereby achieving better spatial utilization, and bringing great convenience to overall arrangement of an assembly of the differential 100 and a restriction to weight. In addition, this structure has higher reliability and better transmission efficiency, thereby improving the reliability of the power transmission chain and the power output fluency at a corner. This structure has better practicability relative to a symmetrical bevel gear differential.

The following describes in detail the meshing relationship between the first planet gear 12 and the second planet gear 22 with reference to a specific embodiment.

As shown in FIG. 3, and FIG. 5 to FIG. 7, the first planet gear 12 and the second planet gear 22 partially overlap in an axial direction (the left-right direction in FIG. 7). That is, only a part of the first planet gear 12 and a part of the second planet gear 22 overlap, and the other part of the first planet gear 12 and the other part of the second planet gear 22 are staggered. The overlapping parts of the first planet gear 12 and the second planet gear 22 mesh with each other, and the staggered parts may mesh with respective ring gears.

As shown in FIG. 6 and FIG. 7, the first planet gear 12 may include a first tooth part 151 and a second tooth part 152 (a dashed line K2 in FIG. 7 is a boundary), and the second planet gear 22 may include a third tooth part 153 and a fourth tooth part 154 (a dashed line K1 in FIG. 7 is a boundary). The second tooth part 152 and the third tooth part 153 form the overlapping parts, that is, the second tooth part 152 and the third tooth part 153 overlap in the axial direction and mesh with each other. The first tooth part 151 and the fourth tooth part 154 are staggered in the axial direction and mesh with the respective ring gears, that is, the first tooth part 151 meshes with the first ring gear 13, and the fourth tooth part 154 meshes with the second ring gear 23. It should be noted that locations of the dashed lines K1 and K2 may be adjusted according to actual situations, and this is not limited herein.

Therefore, the axial size of the differential 100 is more compact, and a volume of the differential 100 is smaller, facilitating mounting and arrangement of the differential 100.

The following describes in detail the power input end and the power output ends of the differential 100 with reference to a specific embodiment.

The differential 100 further includes differential input shafts 31 and 32 and differential output shafts 41 and 42, and the differential input shafts 31 and 32 are respectively connected to the first planet carrier 11 and the second planet carrier 21. In an example of FIG. 3, a left side of the first planet carrier 11 is connected to the differential input shaft 31, and a right side of the planet carrier 21 is connected to the differential input shaft 32. The differential output shafts 41 and 42 are respectively connected to the first ring gear 13 and the second ring gear 23. In the example of FIG. 3, a left side of the first ring gear 13 is connected to the differential output shaft 41, and a right side of the ring gear 23 is connected to the differential output shaft 42. The differential input shafts 31 and 32, the differential output shafts 41 and 42, the first ring gear 13, and the second ring gear 23 may be coaxially arranged.

As shown in FIG. 3, the differential input shafts include the first differential input shaft 31 and the second differential input shaft 32, the first differential input shaft 31 is connected to the first planet carrier 11, and the second differential input shaft 32 is connected to the second planet carrier 21. The differential output shafts may include the first differential output shaft 41 and the second differential output shaft 42, the first differential output shaft 41 is connected to the first ring gear 13, and the second differential output shaft 42 is connected to the second ring gear 23. The first differential input shaft 31, the second differential input shaft 32, the first differential output shaft 41, and the second differential output shaft 42 may be of a hollow shaft structure. In some embodiments, the first differential output shaft 41 is coaxially sleeved on the first differential input shaft 31, and the second differential output shaft 42 is coaxially sleeved on the second differential input shaft 32. Therefore, the differential 100 has a more compact structure and a smaller volume.

The foregoing differential input shafts and the differential output shafts are merely one implementation. In an embodiment of the power-driven system in FIG. 10 to FIG. 20, the differential 100 outputs power with outer teeth of the ring gears.

In some embodiments of the present disclosure, a quantity of teeth of the first ring gear 13 is the same as a quantity of teeth of the second ring gear 23, and a quantity of teeth of the first planet gear 12 is the same as a quantity of teeth of the second planet gear 22.

In some embodiments of the present disclosure, both the first planet gear 12 and the second planet gear 22 are cylindrical gears. Compared with a conventional symmetrical bevel gear differential, the differential 100 using the cylindrical gears has a more compact structure. Specifically, the spatial utilization is higher in structure and connection manner, the axial size is smaller, and advantages are brought to production and assembling.

The following describes in detail structures of the first ring gear 13 and the second ring gear 23 with reference to a specific embodiment.

In some embodiments of the present disclosure, the first ring gear 13 and the second ring gear 23 are symmetric structures. In other words, the first ring gear 13 and the second ring gear 23 are disposed symmetrically, thereby increasing the universality of the ring gear and reducing the costs.

As shown in FIG. 1 and FIG. 3, each of the first ring gear 13 and the second ring gear 23 includes a main plate part 161 and an annular side wall part 162 disposed on an outer periphery of the main plate part 161. The main plate part 161 and the annular side wall part 162 may be an integrated part. Multiple teeth are disposed on an inner surface of the annular side wall part 162, and cavities A1 and A2 (referring to FIG. 3) are limited between the main plate part 161 and the annular side wall part 162. That is, the cavity A1 is limited between the main plate part 161 and the annular side wall part 162 of the first ring gear 13, and the cavity A2 is limited between the main plate part 161 and the annular side wall part 162 of the second ring gear 23, and the cavity A1 inside the first ring gear 13 and the cavity A2 inside the second ring gear 23 face towards each other to form mounting space A (referring to FIG. 3). The first planet carrier 11, the first planet gear 12, the second planet carrier 21, and the second planet gear 22 are accommodated inside the mounting space A. In this way, the differential 100 has a more compact structure and a smaller volume, and is easily arranged. In addition, the first ring gear 13 and the second ring gear 23 serve as an outer housing, to protect the planet carriers and the planet gears accommodated inside the mounting space, thereby expanding the service life. In addition, the mounting space A limited by the first ring gear 13 and the second ring gear 23 is closed, and external matters cannot easily enter the mounting space A to affect the moving parts, thereby ensuring the stable operation of the differential 100.

Figure 2:
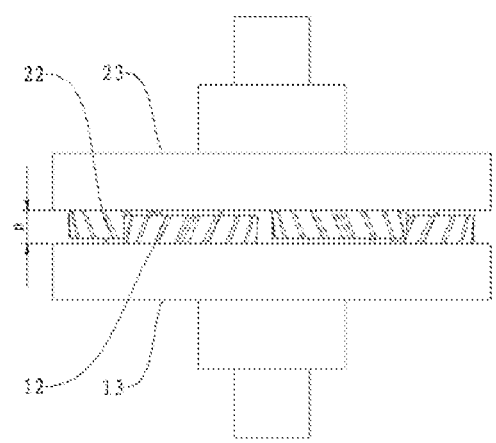
FIG. 2 is a front view of the differential according to an embodiment of the present disclosure.

As shown in FIG. 2, a clearance D is disposed between the first ring gear 13 and the second ring gear 23 in an axial direction. That is, the first ring gear 13 and the second ring gear 23 are spaced in the axial direction, and do not abut against each other. For a person skilled in the art, since a width of a meshing part between the first planet gear 12 and the second planet gear 22 determines a size of the clearance D, that is, the width of the meshing part between the first planet gear 12 and the second planet gear 22 is equal to a minimum value of the clearance D, the size of the clearance D can be controlled indirectly by controlling the width of the meshing part between the first planet gear 12 and the second planet gear 22. For a person skilled in the art, under the premise of ensuring that the first planet gear 12 and the second planet gear 22 can transmit power stably and ensuring the service life of the first planet gear 12 and the second planet gear 22, the width of the meshing part between the first planet gear 12 and the second planet gear 22 may be set relatively narrow. In this way, the clearance D can be reduced effectively, so that the differential 100 has a smaller and more compact axial size, and is easily arranged.

It should be noted that in the embodiments of FIG. 1, FIG. 2, and FIG. 3, each of the first ring gear 13 and the second ring gear 23 includes the main plate part 161 and the annular side wall part 162, and the clearance D in FIG. 2 (with reference to FIG. 1 and FIG. 3) is a distance between the annular side wall part 162 of the first ring gear 13 and the annular side wall part 162 of the second ring gear 23.

Figure 8:
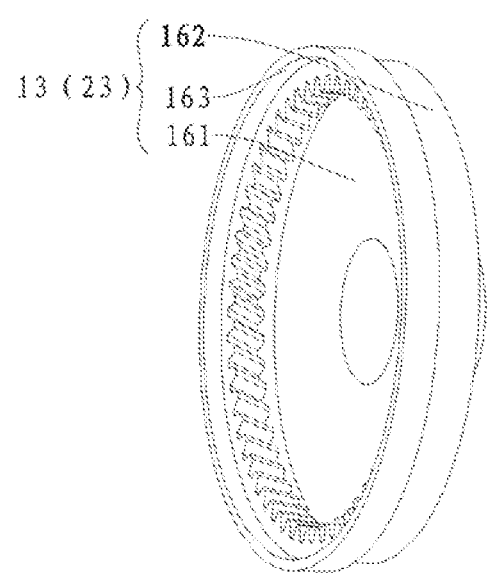
FIG. 8 is a three-dimensional view of a first ring gear or a second ring gear according to an embodiment of the present disclosure.
Figure 9:
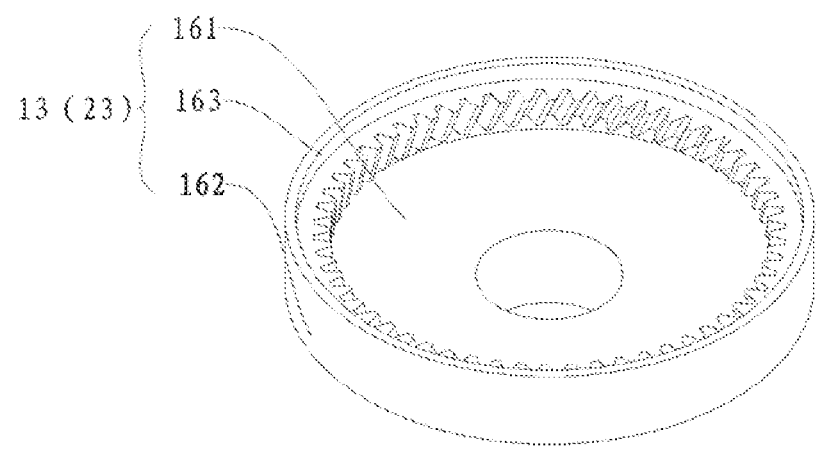
FIG. 9 is a three-dimensional view of a first ring gear or a second ring gear according to another embodiment of the present disclosure.

In some other embodiments of the present disclosure, for example, in the embodiments of FIG. 8 and FIG. 9, each of the first ring gear 13 and the second ring gear 23 further includes an annular flange part 163. The annular flange part 163 extends from an end of the annular side wall part 162 at a direction away from the main plate part 161. In the embodiment of FIG. 8, an inner diameter of the annular flange part 163 may be approximately equal to an outer diameter of the annular side wall part 162. In this way, the annular flange part 163 projects out of the annular side wall part 162 (that is, an outer periphery of the first ring gear 13 or the second ring gear 23) in a radial direction. In the embodiment of FIG. 9, an outer diameter of the annular flange part 163 may be approximately equal to the outer diameter of the annular side wall part 162, and the inner diameter of the annular flange part 163 may be greater than an inner diameter of the annular side wall part 162. That is, thickness of the annular flange part 163 is less than thickness of the annular side wall part 162.

However, it should be noted that, in the ring gear structures in the embodiments of FIG. 1, FIG. 2, and FIG. 3, the clearance D between the two ring gears is a clearance between the annular side wall parts 162 of the two ring gears. In the ring gears structures in the embodiments of FIG. 8 and FIG. 9, the clearance D between the two ring gears is a clearance between the annular flange parts 163 of the two ring gears.

In some embodiments of the present disclosure, because the first ring gear 13 and/or the second ring gear 23 may further include the annular flange part 163, when this ring gear structure is used, due to the annular flange part 163, the clearance D may be further reduced at least partially compared with the structure having no annular flange part 163, and in some embodiments, the clearance D may be reduced to zero. For example, the first ring gear 13 and the second ring gear 23 both may use the ring gear structure shown in FIG. 8. In this case, an end of the annular flange part 163 of the first ring gear 13 may basically abut against an end of the annular flange part 163 of the second ring gear 23, so that the clearance D is zero. In this way, the mounting space A is closed, it is more difficult for external materials to enter the mounting space A and affect the moving parts, thereby ensuring the stable operation of the differential 100. Certainly, it should be understood that the description herein is merely exemplary, and cannot be understood as a limitation to the protection scope of the present disclosure. A person skilled in the art may flexibly select and combine types of ring gears after reading the foregoing content and understanding the technical idea that the clearance D may be further reduced and even may be reduced to zero by disposing the annular flange part 163. For example, it is ensured that at least one ring gear has the annular flange part 163, so that the clearance D can be further reduced and even can be reduced to zero, and the mounting space A is closed.

In addition, in some embodiments, radial sizes of the first ring gear 13 and the second ring gear 23 are the same, and each of the first ring gear 13 and the second ring gear 23 may be an integrated part.

The foregoing has described in detail the differential 100 in this embodiment of the present disclosure, and the following describes in detail the remaining structure of the power-driven system 1000.

As shown in FIG. 10 to FIG. 15, the transmission 104 may include multiple input shafts 101 and 102, and a power output shaft 103. In some embodiments, the transmission 104 may include one power output shaft 103. However, this is not limited thereto. The power output shaft 103 is configured to be linked to the power input end of the differential 100. That is, the power output shaft 103 is configured to be linked to the first planet carrier 11 and the second planet carrier 21.

Figure 10:
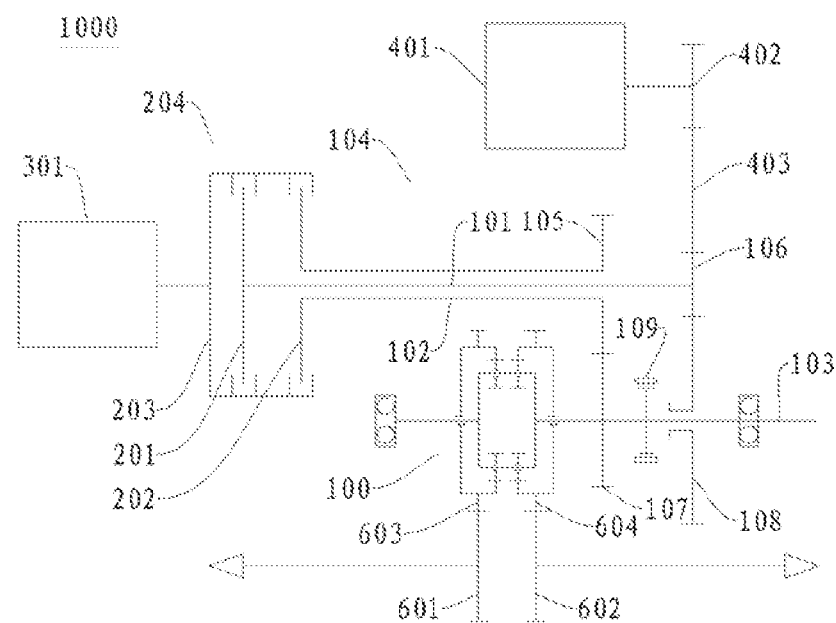
FIG. 10 is a schematic view of a power-driven system according to an embodiment of the present disclosure.

One input shaft in the multiple input shafts 101 and 102 is configured to be selectively linked to the power output shaft 103. In other words, as shown in FIG. 10, one input shaft, for example, the first input shaft 101 (the second input shaft 102 in FIG. 11), can be linked to the power output shaft 103, and the one input shaft, for example, the first input shaft 101, can also be disconnected from the power output shaft 103. The other input shaft is configured to be linked to the power output shaft 103. That is, when input shafts move, the power output shaft 103 moves together, or when the power output shaft 103 moves, the input shafts move together.

As shown in FIG. 10, the first motor generator 401 is configured to be linked to the one input shaft, for example, the first input shaft 101. That is, the input shaft linked to the first motor generator 401 is an input shaft selectively linked to the power output shaft 103.

In some embodiments, a free driven gear 108 is freely sleeved on the power output shaft 103, the free driven gear 108 is linked to the one input shaft, and a synchronizer 109 is configured to synchronize the power output shaft 103 and the free driven gear 108. It may be understood that when the synchronizer 109 is in a connected state, the synchronizer 109 synchronizes the free driven gear 108 and the power output shaft 103. In this way, power from the first motor generator 401 can be output from the power output shaft 103 to the differential 100 with a connection function of the synchronizer 109. When the synchronizer 109 is in a disconnected state, the first motor generator 401 is disconnected from the power output shaft 103. Therefore, the synchronizer 109 serves as a power switch of the first motor generator 401, and can control power output and disconnection of the first motor generator 401.

In some embodiments, the synchronizer 109 is disposed on the power output shaft 103 and is used to connect to the free driven gear 108. Therefore, the structure is simple, and the implementation is easy.

A drive manner between the other input shaft and the power output shaft 103 may be gear drive. For example, a fixed driven gear 107 is fixedly disposed on the power output shaft 103, and the fixed driven gear 107 is linked to the other input shaft. That is, the input shaft 101 in the embodiment of FIG. 10 or the input shaft 102 in the embodiment of FIG. 11 is not cancelled.

Figure 11:
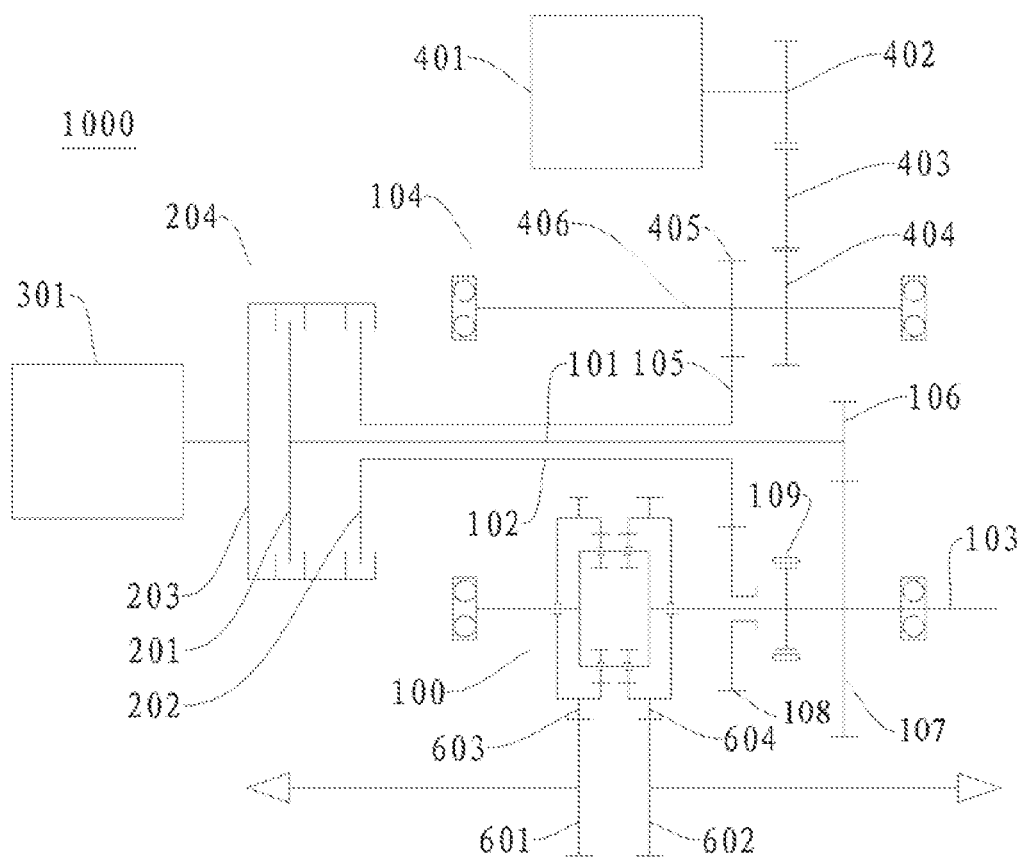
FIG. 11 is a schematic view of a power-driven system according to another embodiment of the present disclosure.

For example, referring to the specific embodiments of FIG. 10 and FIG. 11, the fixed driven gear 107 is fixedly disposed on and the free driven gear 108 is freely sleeved on the power output shaft 103 at the same time, fixed driving gears 105 and 106 are respectively fixedly disposed on the input shafts, and the free driven gear 108 and the fixed driven gear 107 respectively mesh with the corresponding fixed driving gears. For example, a total quantity of the free driven gear 108 and the fixed driven gear 107 is the same as a quantity of the fixed driving gears.

Referring to examples of FIG. 10 and FIG. 11, there is one free driven gear 108 and one fixed driven gear 107, and correspondingly, there are two fixed driving gears. The free driven gear 108 and one fixed driving gear mesh with each other to form one gear pair, and the fixed driven gear 107 and the other fixed driving gear mesh with each other to form another gear pair. It may be understood that transmission speed ratios of the two gear pairs are different. Therefore, the transmission 104 in this embodiment has two transmission gears with two different speed ratios. In this way, the power-driven system 1000 has a relatively simple and compact structure, and can satisfy a requirement of normal travelling of the vehicle for the transmission speed ratio.

As shown in FIG. 10 to FIG. 15, the multiple input shafts include the first input shaft 101 and the second input shaft 102. The first input shaft may be a solid shaft, the second input shaft 102 may be a hollow shaft, and the second input shaft 102 is sleeved on the first input shaft 101. For example, the second input shaft 102 is coaxially sleeved on the first input shaft 101. An axial length of the first input shaft 101 is greater than an axial length of the second input shaft 102, and one end, for example, a right end, of the first input shaft 101 may extend from an inside of the second input shaft 102.

Only one fixed driving gear is fixedly disposed on each input shaft. That is, the fixed driving gears include a first fixed driving gear 106 and a second fixed driving gear 105. The first fixed driving gear 106 is fixedly disposed on the first input shaft 101, and the second fixed driving gear 105 is fixedly disposed on the second input shaft 102.

In examples of FIG. 10 and FIG. 12 to FIG. 15, the free driven gear 108 meshes with the first fixed driving gear 106, and the fixed driven gear 107 meshes with the second fixed driving gear 105. Meanwhile, the first motor generator 401 is linked to the first input shaft 101. For example, the first motor generator 401 is linked to the first fixed driving gear 106 with a gear structure. Specifically, the first motor generator 401 and the first fixed driving gear 106 are driven with a gear 402 and a gear 403, and a transmission speed ratio needed by the first motor generator 401 can be obtained by appropriately designing quantities of teeth of the gears.

In an example of FIG. 11, the free driven gear 108 meshes with the second fixed driving gear 105, and the fixed driven gear 107 meshes with the first fixed driving gear 106. Meanwhile, the first motor generator 401 is linked to the second input shaft 102. For example, the first motor generator 401 is linked to the second fixed driving gear 105 with a gear structure. Specifically, the first motor generator 401 and the second fixed driving gear 105 are driven with the gear 402, the gear 403, a gear 404, and a gear 405, the gear 404 and the gear 405 may be fixed on a same shaft 406, and a transmission speed ratio needed by the first motor generator 401 can be obtained by appropriately designing quantities of teeth of the gears.

In some embodiments, the power-driven system 1000 may further include an engine 301, and the engine 301 is configured to selectively connect to at least one of the multiple input shafts. In some embodiments, there are two input shafts, and a double clutch 204 is disposed between the engine 301 and the two input shafts. The double clutch 204 includes a first connection part 201, a second connection part 202, and a third connection part 203. The first connection part 201 and the second connection part 202 may be two driven disks of the double clutch 204, the third connection part 203 may be a housing of the double clutch 204, and at least one of the two driven disks is selectively connected to the housing. That is, at least one of the first connection part 201 and the second connection part 202 may be selectively connected to the third connection part 203. Certainly, the two driven disks both may be disconnected from the housing. That is, the first connection part 201 and the second connection part 202 both are disconnected from the third connection part 203.

Referring to FIG. 10 to FIG. 15, the engine 301 is connected to the third connection part 203, the first input shaft 101 is connected to the first connection part 201, and the second input shaft 102 is connected to the second connection part 202. In this way, power generated by the engine 301 may be selectively output to the first input shaft 101 and the second input shaft 102 with the double clutch 204.

In some embodiments of the present disclosure, the power output shaft 103, the first planet carrier 11, and the second planet carrier 21 are coaxially fixed, so that a connection part between the transmission 104 and the differential 100 is more compact. That is, the power output shaft 103 and the two planet carriers are coaxially fixed, so that a volume of the power-driven system 1000 can be reduced to some extent.

In some embodiments, as shown in FIG. 10 to FIG. 15, the power-driven system 1000 further includes a first output part 601 and a second output part 602. The first output part 601 is linked to the first ring gear 13, and the second output part 602 is linked to the second ring gear 23. The first output part 601 is a left axle shaft gear, and the second output part 602 is a right axle shaft gear. In addition, first outer teeth 603 are disposed on the first ring gear 13, second outer teeth 604 are disposed on the second ring gear 23, the first outer teeth 603 mesh with the left axle shaft gear 601, and the second outer teeth 604 mesh with the right axle shaft gear 602. Therefore, the power transmitted with the differential 100 can be output to left and right wheels with the left axle shaft gear 601 and the right axle shaft gear 602.

Figure 16:
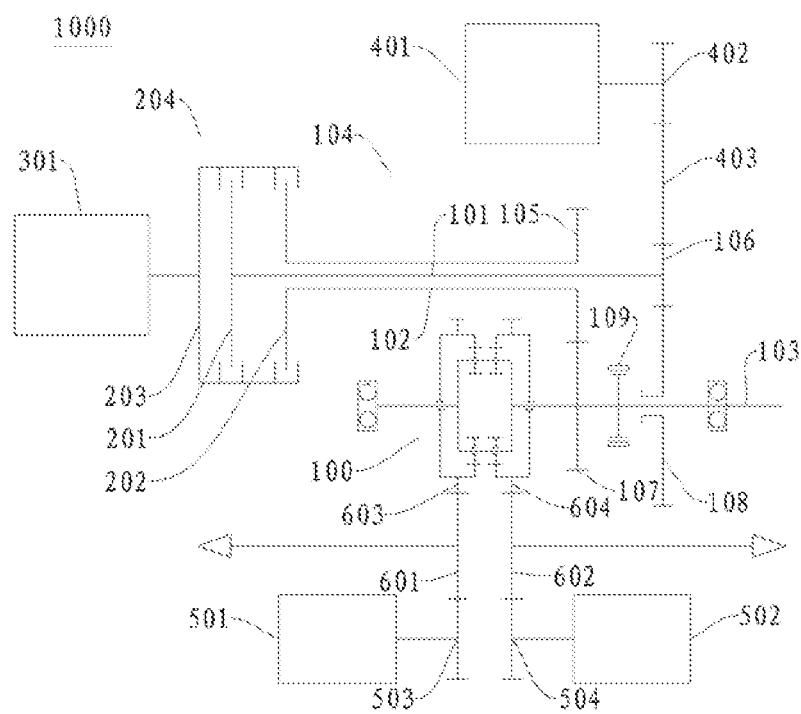
FIG. 16 is a schematic view of a power-driven system according to still another embodiment of the present disclosure.
Figure 17:
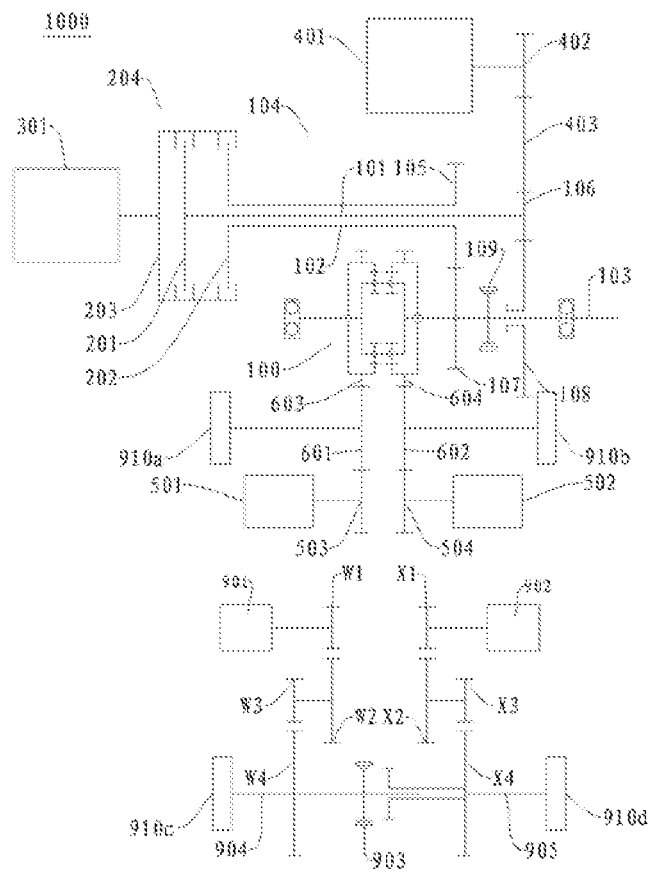
FIG. 17 is a schematic view of a power-driven system according to still another embodiment of the present disclosure.

As shown in FIG. 16 and FIG. 17, the second motor generator 501 is configured to be linked to the first output part 601, and the third motor generator 502 is configured to be linked to the second output part 602. For example, teeth 503 may be disposed on a motor shaft of the second motor generator 501, the teeth 503 mesh with the left axle shaft gear 601, teeth 504 are disposed on a motor shaft of the third motor generator 502, and the teeth 504 mesh with the right axle shaft gear 602.

As shown in FIG. 16 and FIG. 17, the second motor generator 501 and the third motor generator 502 are symmetrically distributed around the differential 100, so that a center of gravity of the power-driven system 1000 is located at a central region or is closer to the central region.

Figure 18:
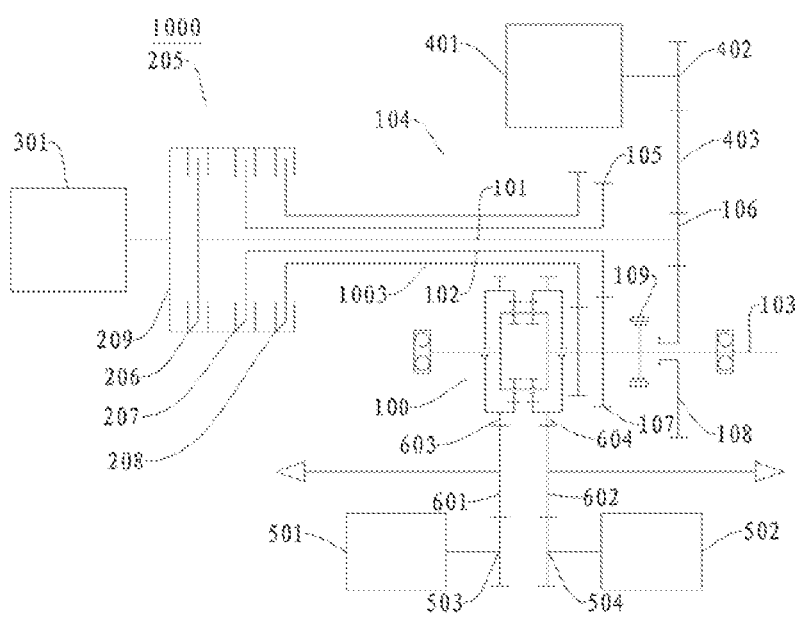
FIG. 18 is a schematic view of a power-driven system according to still another embodiment of the present disclosure.
Figure 19:
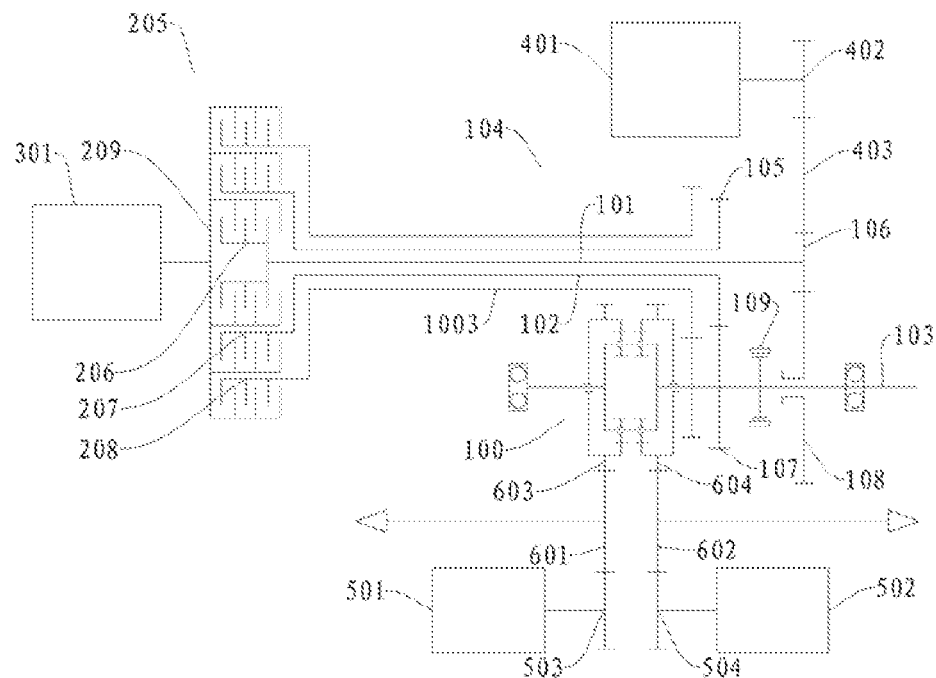
FIG. 19 is a schematic view of a power-driven system according to still another embodiment of the present disclosure.

Referring to the embodiments of FIG. 18 and FIG. 19, a main difference between the power-driven system 1000 in this embodiment and the power-driven system 1000 in the embodiments of FIG. 10 to FIG. 17 lies in a quantity of input shafts. In these embodiments, the input shafts include the first input shaft 101, the second input shaft 102, and a third input shaft 1003. The third input shaft 1003 may be a hollow shaft and is sleeved on the second input shaft 102, the second input shaft 102 may be a hollow shaft and is sleeved on the first input shaft 101, and the three input shafts may be coaxially arranged. The engine 301 is connected to the first input shaft 101, the second input shaft 102, and the third input shaft 1003 with a triple clutch 205. Specifically, the triple clutch 205 includes a first driven disk 206, a second driven disk 207, a third driven disk 208, and a housing 209. The housing 209 is selectively connected to at least one of the first driven disk 206, the second driven disk 207, and the third driven disk 208. The first input shaft 101 is connected to the first driven disk 206, the second input shaft 102 is connected to the second driven disk 207, the third input shaft 1003 is connected to the third driven disk 208, and the engine 301 is connected to the housing 209. In the embodiment of FIG. 18, the first driven disk 206, the second driven disk 207, and the third driven disk 208 are arranged in an axial direction, and in the embodiment of FIG. 19, the first driven disk 206, the second driven disk 207, and the third driven disk 208 are arranged in a radial direction.

The following briefly describes typical working conditions of the power-driven system 1000 in this embodiment of the present disclosure with reference to FIG. 10.

For example, the first connection part 201 is connected to the third connection part 203, the second connection part 202 is disconnected from the third connection part 203, and the synchronizer 109 is in a connected state. In this case, the power generated by the engine 301 is output to the differential 100 with the first input shaft 101 and the power output shaft 103, and the differential 100 allocates the power to the two driving wheels.

For another example, the second connection part 202 is connected to the third connection part 203, the first connection part 201 is disconnected from the third connection part 203, and the synchronizer 109 is in a disconnected state. In this case, the power generated by the engine 301 is output to the differential 100 with the second input shaft 102 and the power output shaft 103, and the differential 100 allocates the power to the two driving wheels.

For still another example, the double clutch 204 is disengaged, the synchronizer 109 is in a connected state, and the power generated by the first motor generator 401 is output to the differential 100 with the first input shaft 101 and the power output shaft 103, and the differential 100 allocates the power to the two driving wheels.

For still another example, the first connection part 201 is connected to the third connection part 203, the second connection part 202 is disconnected from the third connection part 203, and the synchronizer 109 is in a disconnected state. In this case, the power generated by the engine 301 is output to the first motor generator 401 with the first input shaft 101, to drive the first motor generator 401 to serve as an electric motor to generate electricity, thereby implementing a stationary power generation function.

A main difference between the embodiment of FIG. 11 and the embodiment of FIG. 10 lies in that in the embodiment of FIG. 11, the first motor generator 401 is linked to the second input shaft 102, while in the embodiment of FIG. 10, the first motor generator 401 is linked to the first input shaft 101. The other parts are not described herein again.

Compared with the embodiment of FIG. 10, in the embodiments of FIG. 12 to FIG. 15, a rear engine rear drive differential lock is added.

Figure 12:
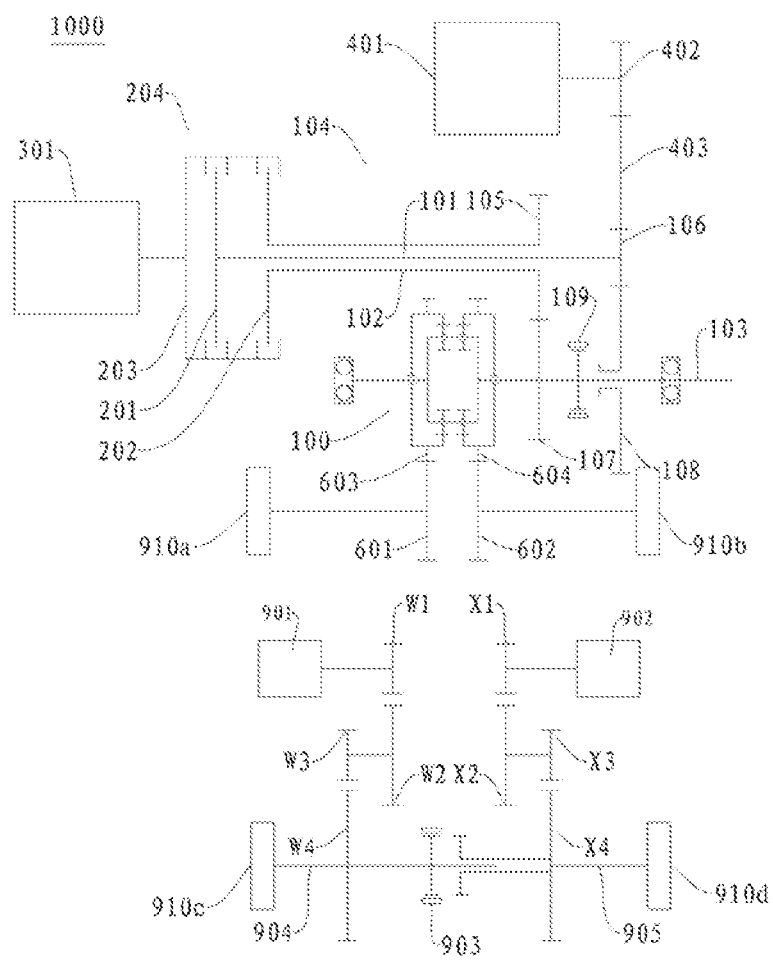
FIG. 12 is a schematic view of a power-driven system according to still another embodiment of the present disclosure.
Figure 13:
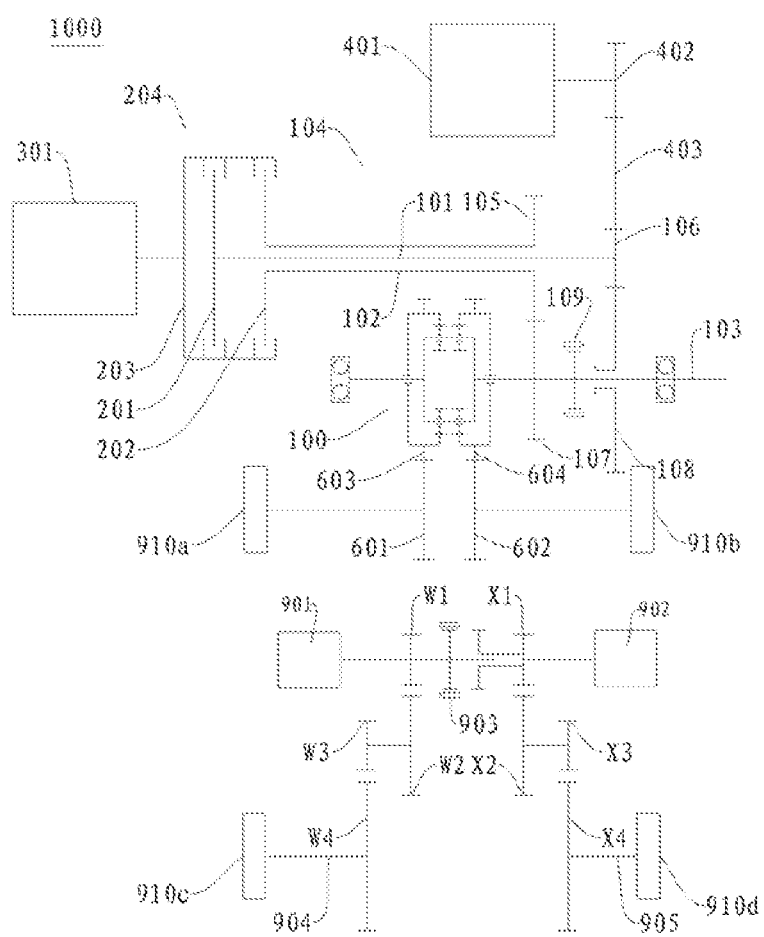
FIG. 13 is a schematic view of a power-driven system according to still another embodiment of the present disclosure.
Figure 14:
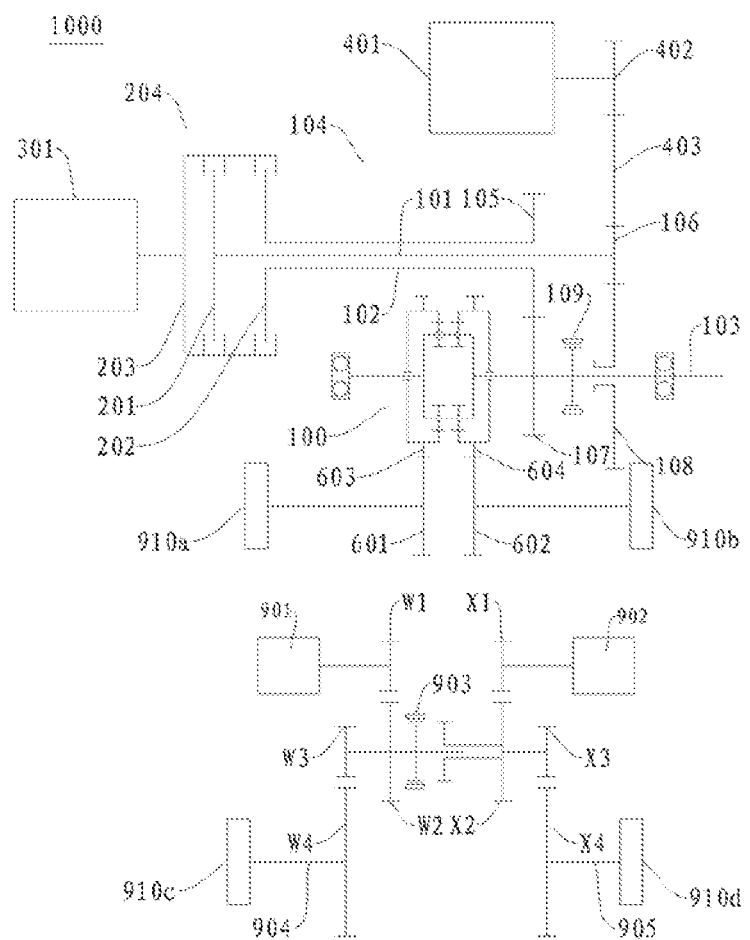
FIG. 14 is a schematic view of a power-driven system according to still another embodiment of the present disclosure.

Referring to FIG. 12 to FIG. 14 and with reference to FIG. 1 to FIG. 9, the first ring gear 13 is linked to a left front wheel 910*a*, for example, the first ring gear 13 is linked to the left front wheel 910*a* with the first outer teeth 603 and the left axle shaft gear 601, and the second ring gear 23 is linked to a right front wheel 910*b*, for example, the second ring gear 23 is linked to the right front wheel 910*b* with the second outer teeth 604 and the right axle shaft gear 602. The fourth motor generator 901 is linked to a left rear wheel 910*c* with a gear structure, for example, the fourth motor generator 901 is linked to the left rear wheel 910*c* with gears W1, W2, W3, and W4. The gear W1 is coaxially connected to the fourth motor generator 901, the gear W1 meshes with the gear W2, the gear W2 is coaxially connected to the gear W3, the gear W3 meshes with the gear W4, the gear W4 may be fixedly disposed on the left axle shaft 904, and the left rear wheel 910*c* is disposed on the left axle shaft 904. Similarly, the fifth motor generator 902 is linked to a right rear wheel 910*d* with a gear structure, for example, the fifth motor generator 902 is linked to the right rear wheel 910*d* with gears X1, X2, X3, and X4. The gear X1 is coaxially connected to the fifth motor generator 902, the gear X1 meshes with the gear X2, the gear X2 is coaxially connected to the gear X3, the gear X3 meshes with the gear X4, the gear X4 may be fixedly disposed on a right axle shaft 905, and the right rear wheel 910*d* is disposed on the right axle shaft 905.

In the example of FIG. 12, an anti-skid synchronizer 903 is configured to synchronize the gear W4 and the gear X4. For example, the anti-skid synchronizer 903 is disposed on the gear W4 and is used to connect to the gear X4. In the example of FIG. 13, the anti-skid synchronizer 903 is configured to synchronize the gear W1 and the gear X1. For example, the anti-skid synchronizer 903 is disposed on the gear W1 and is used to connect to the gear X1. In the example of FIG. 14, the anti-skid synchronizer 903 is configured to synchronize the gear W2 and the gear X2. For example, the anti-skid synchronizer 903 is disposed on the gear W2 and is used to connect to the gear X2.

Figure 15:
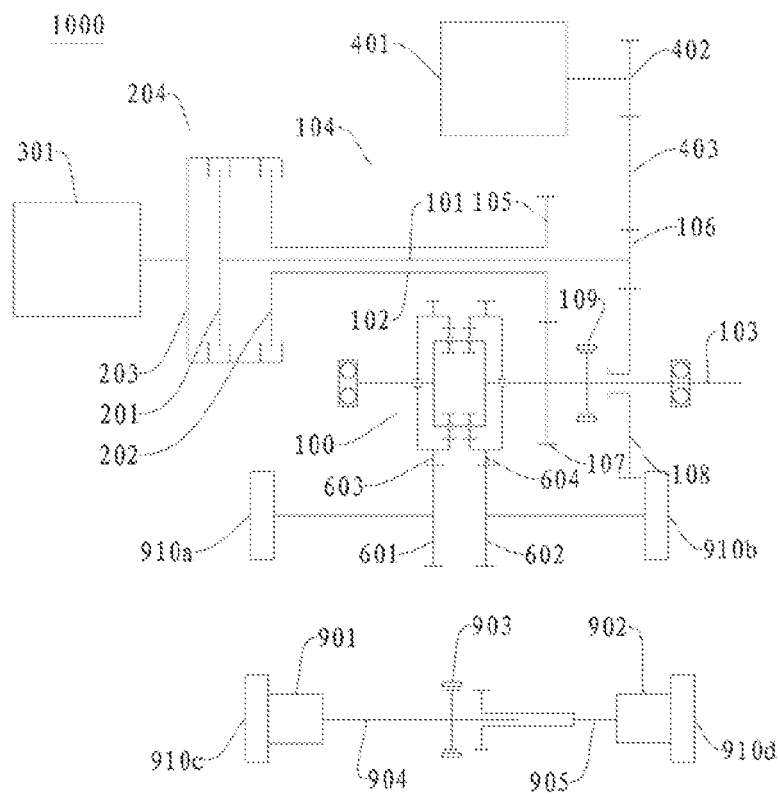
FIG. 15 is a schematic view of a power-driven system according to still another embodiment of the present disclosure.

In the example of FIG. 15, the anti-skid synchronizer 903 is configured to synchronize the let axle shaft 904 and the right axle shaft 905. For example, the anti-skid synchronizer 903 is disposed on the left axle shaft 904 and is used to connect to the right axle shaft 905. In this embodiment, both the fourth motor generator 901 and the fifth motor generator 902 are hub motors.

To sum up, the anti-skid synchronizer 903 is configured to selectively synchronize the left rear wheel 910*c* and the right rear wheel 910*d*. In other words, when the anti-skid synchronizer 903 is in a connected state, the left rear wheel 910*c* and the right rear wheel 910*d* rotate synchronously, that is, rotate in a same direction at a same speed. In this case, the left rear wheel 910*c* and the right rear wheel 910*d* do not rotate at differential speeds. When the anti-skid synchronizer 903 is in a disconnected state, the fourth motor generator 910 may independently drive the left rear wheel 901*c*, the fifth motor generator 902 may independently drive the right rear wheel 910*d*, and the two rear wheels are independent of each other and do not interfere with each other, thereby implementing a differential rotation function of the wheels.

In addition, for the technical solutions and/or technical features described in the foregoing embodiments, a person skilled in the art can combine the technical solutions and/or technical features in the foregoing embodiments in the case of no conflict or contradiction, and the combined technical solution may be obtained by combing at least two technical solutions, or at least two technical features, or at least two technical solutions and technical features, so that the technical solutions and/or technical features can support each other in functions, and the combined solution has a better technical effect.

For example, a person skilled in the art may combine the solution in which the first planet gear 12 and the planet gear 22 partially overlap and the solution in which the first planet carrier 11 and the second planet carrier 21 are of plate-shaped structures, so that the axial size of the differential 100 can be effectively reduced, and the volume of the differential 100 is smaller.

For another example, a person skilled in the art may combine the solution in which the first planet gear 12 and the second planet gear 22 partially overlap and the solution in which the planet gears and the planet carriers are accommodated inside the mounting space, so that not only the axial size of the differential 100 can be effectively reduced, but also damages caused by exposure of the planet gears and the planet carriers can be avoided because the planet gears and the planet carriers are accommodated inside the mounting space, thereby expanding the service life and reducing the maintenance costs.

For another example, a person skilled in the art may combine the solution in which the revolution radius of the first planet gear 12 overlaps the revolution radius of the second planet gear 22 and the solution in which the revolution radius of the first planet gear 12 is the same as the revolution radius of the second planet gear 22, so that the differential 100 has a more compact structure and a smaller volume, facilitating arrangement.

Certainly, it should be understood that the descriptions of the foregoing examples are merely exemplary, for the combination of the technical solutions and/or technical features, a person skilled in the art can make free combination in the case of no conflict, and the combined solution has a better technical effect. The foregoing multiple examples are merely briefly described in the present disclosure, and no enumeration is provided herein.

In addition, it may be understood that the combined technical solution shall fall within the protection scope of the present disclosure.

With the differential 100 in this embodiment of the present disclosure, space can be effectively saved, and weight is reduced. Specifically, compared with the conventional bevel gear differential, with the epicyclic differential 100, the weight can be reduced by approximately 30%, the axial size can be reduced by approximately 70%, frictional force of the bearings can be reduced, and torque allocation between left and right wheels can be implemented, so that the load of the differential 100 is allocated more appropriately, and the rigidity of the differential 100 is better. In addition, due to the cylindrical gear, the transmission efficiency is improved, for example, the transmission efficiency of the conventional bevel gears with 6-grade precision and 7-grade precision is approximately 0.97 to 0.98, while the transmission efficiency of the cylindrical gears with 6-grade precision and 7-grade precision is approximately 0.98 to 0.99. In addition, with the cylindrical gear, working noise of the differential 100 is lowered, heat productivity is reduced, and the service life of the differential 100 is greatly increased. In short, the differential 100 in this embodiment of the present disclosure has the following multiple advantages of a light weight, a small size, low costs, high transmission efficiency, low noise, little heat productivity, and long service life.

In addition, in the differential 100 in this embodiment of the present disclosure, a sun gear may not be used, and there may be the following advantages when the sun gear is not used.

In analysis from the perspective of dynamics, the sun gear should be cancelled and the ring gear is used to implement a differential. Because a quantity of teeth of the ring gear may be greater than a quantity of teeth of the sun gear, and a pitch circle is relatively large (the pitch circle is a pair of circles that are tangent at a pitch point when gears mesh with each other), the load can be allocated and the torque can be borne in a more balanced way, helping expanding the service life of the differential 100. In addition, when the sun gear is not used, lubrication and cooling of the differential 100 can be better implemented. That is, when the sun gear is cancelled, a cavity may be formed inside the ring gear, and lubrication oil can be stored inside the ring gear because the meshing manner between the ring gear and the planet gear is inner meshing (a meshing manner between the sun gear and planet gear is outer meshing), thereby greatly improving the cooling and lubricating effect. In addition, when the sun gear is cancelled, a quantity of parts is reduced, the mass and costs of the differential 100 are reduced, and the differential 100 is smaller and light-weighted.

The power-driven system 1000 having the differential 100 in this embodiment of the present disclosure has obvious advantages in space and driving manner. Using the spatial advantage as an example, the power-driven system 1000 is especially applicable to fuel-efficient vehicles. Since a power assembly of a fuel-efficient vehicle is usually disposed inside an engine compartment, the power assembly not only includes a transmission and an engine, but also includes at least one motor. Due to limited space of the engine compartment, the compact differential 100 in this embodiment of the present disclosure can obtain advantages in space, and is easily arranged. Using the advantage in the driving manner as an example, because the axial size of the differential 100 in this embodiment of the present disclosure is greatly reduced, axial space is better arranged. In addition, the differential 100 has two ring gears as the power output ends, the differential can be in power connection to the two motors (as described above, the differential is connected to the motors with outer teeth of the ring gears), and it is difficult to implement this connection for the conventional bevel differential.

Figure 20:
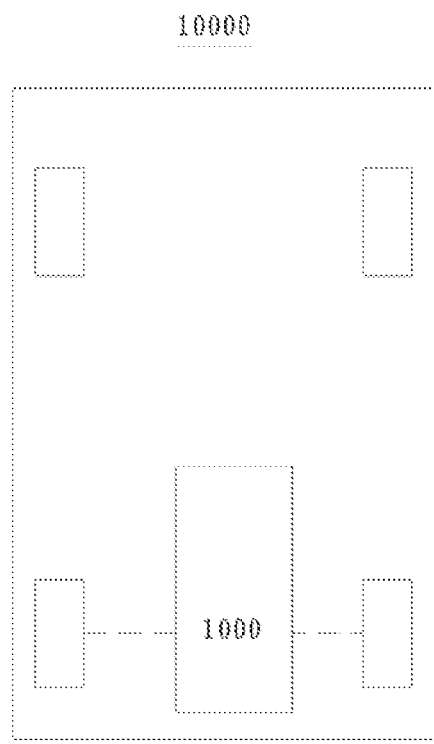
FIG. 20 is a schematic view of a vehicle according to an embodiment of the present disclosure.

The following briefly describes a vehicle 10000 in an embodiment of the present disclosure. As shown in FIG. 20, the vehicle 10000 includes the power-driven system 1000 in the foregoing embodiment. The power-driven system 1000 may be applied to front engine front drive, or may be applied to rear engine rear drive, and this is not specially limited in the present disclosure. It should be understood that other constructions of the vehicle 10000 in the embodiments of the present disclosure, for example, a brake system, a traveling system, and a steering system, are existing technologies, and are well known by a person skilled in the art. Therefore, details are not described herein.

In the descriptions of this specification, descriptions of terms "one embodiment", "some embodiments", "example", "specific example", "some examples", and the like indicate that specific features, structures, materials, or characteristics described with reference to the embodiments or examples are included in at least one embodiment or example of the present disclosure. In this specification, illustrative expressions using the foregoing terms do not necessarily indicate the same embodiments or examples. In addition, the described specific features, structures, materials, or characteristics may be combined in an appropriate manner in any one or multiple embodiments or examples. In addition, a person skilled in the art may combine different embodiments or examples described in this specification.

Although the embodiments of the present disclosure have been shown and described above, it can be understood that, the foregoing embodiments are exemplary and should not be understood as a limitation to the present disclosure. A person of ordinary skill in the art can make changes, modifications, replacements, or variations to the foregoing embodiments within the scope of the present disclosure.

What is claimed is:

1. A power-driven system, comprising:
   a differential, wherein the differential comprises:
   a first planet carrier, a first planet gear, and a first ring gear, wherein the first planet gear is disposed on the first planet carrier and meshes with the first ring gear;
   first outer teeth disposed on the first ring gear that is linked to a first output part, wherein the first outer teeth mesh with the first output part and form a power output end of the first ring gear, and the first output part is a left axle shaft gear;
   a second planet carrier, a second planet gear, and a second ring gear, wherein the second planet gear is disposed on the second planet carrier and meshes with the second ring gear and the first planet gear;
   second outer teeth disposed on the second ring gear that is linked to a second output part, wherein the second outer teeth mesh with the second output part and form a power output end of the second ring gear, and the second output part is a right axle shaft gear; and
   wherein the first ring gear and the second ring gear form two power output ends of the differential, and the first planet carrier and the second planet carrier form a power input end of the differential; and
   an input shaft of the differential respectively linked to the first planet carrier and the second planet carrier, wherein the input shaft of the differential, the first planet carrier, and the second planet carrier are coaxially arranged;
   a power output shaft, wherein the power output shaft is configured to link to the power input end of the differential;
   multiple input shafts, wherein one input shaft of the multiple input shafts is configured to selectively link to the power output shaft, and another one input shaft of the multiple input shafts is configured to link to the power output shaft; and
   a first motor generator, wherein the first motor generator is configured to link to the one input shaft of the multiple input shafts.

2. The power-driven system according to claim 1, wherein the first planet gear comprises a first tooth part and a second tooth part, the second planet gear comprises a third tooth part and a fourth tooth part, the first tooth part meshes with the first ring gear, the second tooth part and the third tooth part overlap in an axial direction and mesh with each other, and the fourth tooth part meshes with the second ring gear.

3. The power-driven system according to claim 1, wherein both the first planet gear and the second planet gear are cylindrical gears.

4. A power-driven system, comprising:
a differential, wherein the differential comprises:
   a first planet carrier, a first planet gear, and a first ring gear, wherein the first planet gear is disposed on the first planet carrier and meshes with the first ring gear; and
   a second planet carrier, a second planet gear, and a second ring gear, wherein the second planet gear is disposed on the second planet carrier, and meshes with the second ring gear and the first planet gear,
   wherein each of the first ring gear and the second ring gear comprises:
   a main plate part and an annular side wall part disposed on an outer periphery of the main plate part, wherein multiple teeth are disposed on an inner surface of the annular side wall part, a cavity is limited between the main plate part and the annular side wall part, a first cavity of the first ring gear and a second cavity of the second ring gear face towards each other to form a mounting space, and the first planet carrier, the first planet gear, the second planet carrier, and the second planet gear are accommodated inside the mounting space, and
   wherein the first ring gear and the second ring gear form two power output ends of the differential, and the first planet carrier and the second planet carrier form a power input end of the differential;
a power output shaft, wherein the power output shaft is configured to link to the power input end of the differential;
multiple input shafts, wherein one input shaft of the multiple input shafts is configured to selectively link to the power output shaft, and another one input shaft of the multiple input shafts is configured to link to the power output shaft; and
a first motor generator, wherein the first motor generator is configured to link to the one input shaft of the multiple input shafts.

5. The power-driven system according to claim 1, wherein a clearance is disposed between the first ring gear and the second ring gear in an axial direction.

6. The power-driven system according to claim 1, wherein a first planet gear shaft is disposed for each first planet gear, two ends of the first planet gear shaft are respectively connected to the first planet carrier and the second planet carrier, a second planet gear shaft is disposed for each second planet gear, and two ends of the second planet gear shaft are respectively connected to the first planet carrier and the second planet carrier.

7. A power-driven system, comprising:
a differential, wherein the differential comprises:
   a first planet carrier, a first planet gear, and a first ring gear, wherein the first planet gear is disposed on the first planet carrier and meshes with the first ring gear; and
   a second planet carrier, a second planet gear, and a second ring gear, wherein the second planet gear is disposed on the second planet carrier, and meshes with the second ring gear and the first planet gear,
   wherein a first revolution axis of the first planet gear overlaps a second revolution axis of the second planet gear, and a first revolution radius of the first planet gear is the same as a second revolution radius of the second planet gear, and
   wherein the first ring gear and the second ring gear form two power output ends of the differential, and the first planet carrier and the second planet carrier form a power input end of the differential;
a power output shaft, wherein the power output shaft is configured to link to the power input end of the differential;
multiple input shafts, wherein one input shaft of the multiple input shafts is configured to selectively link to the power output shaft, and another one input shaft of the multiple input shafts is configured to link to the power output shaft; and
a first motor generator, wherein the first motor generator is configured to link to the one input shaft of the multiple input shafts.

8. The power-driven system according to claim 1, wherein the power output shaft, the first planet carrier, and the second planet carrier are coaxially fixed.

9. The power-driven system according to claim 1, further comprising: an engine, wherein the engine is configured to selectively connect to at least one of the multiple input shafts.

10. The power-driven system according to claim 1, further comprising:
a synchronizer; and
a free driven gear freely sleeved on the power output shaft, wherein the free driven gear is linked to the one input shaft of the multiple input shafts, and the synchronizer is disposed on the power output shaft and configured to connect to the free driven gear to synchronize the power output shaft and the free driven gear.

11. The power-driven system according to claim 10, wherein a fixed driven gear is fixedly disposed on the power output shaft, and the fixed driven gear is linked to the another one input shaft of the multiple input shafts.

12. The power-driven system according to claim 1, further comprising:
a free driven gear freely sleeved on the power output shaft;
a fixed driven gear fixedly disposed on the power output shaft;
a synchronizer configured to synchronize the power output shaft and the free driven gear; and
a fixed driving gear fixedly disposed on each of the multiple input shaft, wherein the free driven gear and the fixed driven gear respectively mesh with corresponding fixed driving gears.

13. The power-driven system according to claim 12, wherein
the multiple input shafts comprise a first input shaft and a second input shaft, wherein the second input shaft is sleeved on the first input shaft; and
the fixed driving gears comprise a first fixed driving gear fixed on the first input shaft and a second fixed driving gear fixed on the second input shaft, and wherein:
   the first input shaft is the one input shaft of the multiple input shafts, and the first motor generator is linked to the first fixed driving gear with a gear structure; or
   the second input shaft is the one input shaft of the multiple input shafts, and the first motor generator is linked to the second fixed driving gear with a gear structure.

14. The power-driven system according to claim 13, further comprising:
an engine; and
a double clutch comprising a first connection part, a second connection part and a third connection part, wherein the third connection part is configured to selectively connect to at least one of the first connection part and the second connection part, the engine is connected to the third connection part, the first input shaft is connected to the first connection part, and the second input shaft is connected to the second connection part.

15. The power-driven system according to claim 1, further comprising:
a second motor generator and a third motor generator, wherein the second motor generator is linked to the first output part, and the third motor generator is linked to the second output part.

16. The power-driven system according to claim 1, wherein the multiple input shafts comprise a first input shaft, a second input shaft, and a third input shaft, wherein the third input shaft is sleeved on the second input shaft, the second input shaft is sleeved on the first input shaft, and an engine is connected to the first input shaft, the second input shaft, and the third input shaft with a triple clutch.

17. The power-driven system according to claim 1, further comprising:
a second motor generator linked to a left rear wheel;
a third motor generator linked to a right rear wheel; and
an anti-skid synchronizer configured to selectively synchronize the left rear wheel and the right rear wheel to have the left rear wheel and the right rear wheel rotate synchronously,
wherein the first ring gear is linked to a left front wheel, and the second ring gear is linked to a right front wheel.

18. A vehicle, comprising the power-driven system according to claim 1.

* * * * *